US009368097B2

(12) United States Patent
Furuta

(10) Patent No.: US 9,368,097 B2
(45) Date of Patent: Jun. 14, 2016

(54) NOISE SUPPRESSION DEVICE

(75) Inventor: Satoru Furuta, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 193 days.

(21) Appl. No.: 14/124,118

(22) PCT Filed: Nov. 2, 2011

(86) PCT No.: PCT/JP2011/006143

§ 371 (c)(1), (2), (4) Date: Dec. 5, 2013

(87) PCT Pub. No.: WO2013/065088

PCT Pub. Date: May 10, 2013

(65) Prior Publication Data

US 2014/0098968 A1 Apr. 10, 2014

(51) Int. Cl.

*G10K 11/16* (2006.01)
*G10L 21/0232* (2013.01)
*H04B 15/00* (2006.01)

(52) U.S. Cl.

CPC ............ *G10K 11/16* (2013.01); *G10L 21/0232* (2013.01)

(58) Field of Classification Search

CPC ............ G10L 21/0208; G10L 21/0232; G10L 2021/02168; G10L 21/0264; G10L 2021/02085; G10L 2021/02163; G10L 21/02; G10L 21/038; G10L 25/78; G10L 19/012; G10L 19/0204; G10L 19/26; G10L 21/0364; G10L 21/0388; G10L 25/84; H04B 3/23; H04R 3/002

USPC .......... 381/94.1, 94.2, 71.1, 317, 71.12, 94.7, 381/98; 382/275, 224; 704/225, 226, 233, 704/205, 207, 200, 208, 214, 258, 263, 266, 704/275, 500; 375/346, 285; 379/392.01

See application file for complete search history.

(56) References Cited

U.S. PATENT DOCUMENTS

| | | | | |
|---|---|---|---|---|
| 2003/0023430 | A1* | 1/2003 | Wang | G10L 19/26 704/226 |
| 2010/0056063 | A1 | 3/2010 | Sudo | |
| 2013/0003987 | A1* | 1/2013 | Furuta et al. | 381/94.3 |

FOREIGN PATENT DOCUMENTS

| | | |
|---|---|---|
| JP | 11 259090 | 9/1999 |
| JP | 2010 55024 | 3/2010 |

(Continued)

OTHER PUBLICATIONS

Ephraim, Y., et al., "Speech Enhancement Using a Minimum Mean-Square Error Short-Time Spectral Amplitude Estimator", IEEE Transactions on Acustics, Speech , and Signal Processing, vol. ASSP-32, No. 6, pp. 1109-1121, (Dec. 1984).

(Continued)

*Primary Examiner* — Paul S Kim
*Assistant Examiner* — Norman Yu
(74) *Attorney, Agent, or Firm* — Oblon, McClelland, Maier & Neustadt, L.L.P.

(57) ABSTRACT

A noise suppression device includes an input signal analyzer that analyzes the harmonic structure and periodicity of a plurality of input signals on the basis of power spectra of a plurality of input signals, a power spectrum synthesizer that synthesizes the power spectra of the plurality of input signals to generate a synthesized power spectrum according to the result of the analysis by the input signal analyzer, a noise suppression amount calculator that calculates an amount of noise suppression on the basis of the synthesized power spectrum and an estimated noise spectrum estimated from the input signals, and a power spectrum suppressor that carries out noise suppression on the synthesized power spectrum by using the calculated amount of noise suppression.

6 Claims, 11 Drawing Sheets

(56) References Cited

FOREIGN PATENT DOCUMENTS

| | | | |
|---|---|---|---|
| JP | 4445460 | B2 | 4/2010 |
| WO | 2011 111091 | | 9/2011 |

OTHER PUBLICATIONS

Kaneda, Y., et al., "Adaptive Microphone-Array System for Noise Reduction", IEEE Transactions on Acustics, Speech, and Signal Processing, vol. ASSP-34, No. 6, pp. 1391-1400, (Dec. 1986).

Lotter, T., et al., "Speech Enhancement by MAP Spectral Amplitude Estimation Using a Super-Gaussian Speech Model", EURASIP Journal on Applied Signal Processing, No. 7, pp. 1110-1126, (2005).

Boll, S.F., "Suppression of Acoustic Noise in Speech Using Spectral Subtraction", IEEE Transactions on Acoustics, Speech, and Signal Processing, vol. ASSP-27, No. 2, pp. 113-120, (Apr. 1979).

International Search Report Issued Dec. 13, 2011 in PCT/JP11/006143 Filed Nov. 2, 2011.

Japanese Office Action issued Jun. 17, 2014, in Japan Patent Application No. 2013-541483 (with English translation).

* cited by examiner

NOISE SUPPRESSION DEVICE

FIELD OF THE INVENTION

The present invention relates to a noise suppression device that suppresses background noise mixed into an input signal, and that is used for an improvement in the sound quality of a voice communication system, such as a car navigation, a mobile phone, a television phone, or an interphone, a handsfree call system, a TV conference system, a monitoring system, etc., into which, for example, voice communications, a voice storage, and a voice recognition system are introduced, and an improvement in the recognition rate of a voice recognition system.

BACKGROUND OF THE INVENTION

As a digital signal processing technology has moved forward in recent years, an operation of making a voice call outdoors using a mobile phone, an operation of making a handsfree phone call in a vehicle, and a handsfree operation using a voice recognition have become popular. Because these devices are used in a high-level noise environment in many cases, background noise is also inputted to a microphone together with a voice, and this causes degradation in the call voice, a reduction in the voice recognition rate, and so on. Therefore, in order to implement a comfortable voice call and a high-accuracy voice recognition, a noise suppression device that suppresses background noise mixed into an input signal is needed.

As a conventional noise suppression method, for example, there is a method of transforming an input signal in a time domain into a power spectrum which is a signal in a frequency domain, calculating a suppression amount for noise suppression by using the power spectrum of the input signal and an estimated noise spectrum which is separately estimated from the input signal, carrying out amplitude suppression on the power spectrum of the input signal by using the acquired suppression amount, and transforming the power spectrum on which the amplitude suppression is carried out and a phase spectrum of the input signal into signals in a time domain to acquire a noise suppression signal (refer to nonpatent reference 1).

While the suppression amount is calculated on the basis of the ratio (referred to as the SN ratio from here on) between the power spectrum of the voice and the estimated noise power spectrum in accordance with this conventional noise suppression method, the suppression amount cannot be calculated correctly when the value of the ratio is negative (expressed in decibels). For example, in a voice signal onto which noise having large power in a low frequency range thereof and occurring when a vehicle is travelling is superimposed, a low-frequency component of the voice is buried in the noise and therefore the SN ratio becomes negative. A problem is that this results in excessive suppression of the low-frequency component of the voice signal, and hence degradation in the voice quality.

To solve the above-mentioned problem, as a method of efficiently extracting a voice signal which is an object signal by using a plurality of microphones (microphone array), thereby implementing high-quality noise suppression even under high-level noise conditions, for example, nonpatent reference discloses a beamforming method and patent reference 1 discloses a voice-collecting device having a function of extracting an object signal.

According to the nonpatent reference 2, a high-quality noise suppression device that uses space information, such as a phase difference occurring when an object signal from a sound source reaches each of microphones, to synthesize signals from the microphones and enhance the object signal, thereby improving the SN ratio between the voice signal which is the object signal and noise, is implemented.

Further, the patent reference 1 discloses, as a technology of extracting an object signal in a noise environment, a method of using a difference in sound field distribution between an object signal and noise to extract a frequency component in which the object signal is dominant on a frequency axis. The method disclosed by this patent reference 1 is subject to the condition that a main input microphone is located close to the sound source of the object signal and an auxiliary input microphone is located at a position distant from the above-mentioned sound source rather than the main input microphone, and the extraction of the frequency component in which the object signal is dominant is implemented while an attention is given to the fact that the characteristics of a level difference occurring between these two microphones differ between noise and the object signal, thereby achieving an improvement in the sound quality.

RELATED ART DOCUMENT

Patent reference

Patent reference 1: Japanese Unexamined Patent Application Publication No. Hei 11-259090 (pp. 3-5 and FIG. 1)

Nonpatent reference

Nonpatent reference 1: Y. Ephraim, D. Malah, "Speech Enhancement Using a Minimum Mean Square Error Short-Time Spectral Amplitude Estimator", IEEE Trans. ASSP, vol. ASSP-32, No. 6 Dec. 1984

Nonpatent reference 2: Y. Kaneda, J. Ohga, "Adaptive Microphone-Array System for Noise Reduction", IEEE Trans. ASSP, vol. ASSP-34, No. 6, December 1986

SUMMARY OF THE INVENTION

Problems to be Solved by the Invention

A problem with the conventional technology disclosed by the nonpatent reference 2 is that the conventional technology is based on the premise that the sound source (object signal) which is enhanced is located at a position different from that of the other sound source (noise), and, when the object signal and noise are existing in the same direction, the object signal cannot be enhanced and hence the performance drops. Further, a problem with the conventional technology disclosed by the patent reference is that when the object signal is inputted to both the main microphone and the auxiliary microphone, such as when the main microphone and the auxiliary microphone are arranged close to each other, it is difficult to detect the level difference between the object signal and noise, and therefore no improvement in the sound quality can be established.

The present invention is made in order to solve the above-mentioned problems, and it is therefore an object of the present invention to provide a noise suppression device that implements high-quality noise suppression even in a high-level noise environment.

Means for Solving the Problem

In accordance with the present invention, there is provided a noise suppression device including: a Fourier transformer that transforms a plurality of input signals inputted thereto from signals in a time domain to spectral components which are signals in a frequency domain; a power spectrum calculator that calculates power spectra from the spectral components which are transformed by the Fourier transformer; an input signal analyzer that analyzes the harmonic structure and periodicity of the input signals on the basis of the power spectra calculated by the power spectrum calculator; a power spectrum synthesizer that carries out a synthesis from the power spectra of the plurality of input signals according to the result of the analysis by the input signal analyzer to generate a synthesized power spectrum; a noise suppression amount calculator that calculates an amount of noise suppression on the basis of the synthesized power spectrum generated by the power spectrum synthesizer and an estimated noise spectrum estimated from the input signals; a power spectrum suppressor that carries out noise suppression on the synthesized power spectrum generated by the power spectrum synthesizer by using the amount of noise suppression calculated by the noise suppression amount calculator; and an inverse Fourier transformer that transforms the synthesized power spectrum on which the noise suppression is carried out by the power spectrum suppressor into a signal in a time domain, and outputs this signal as a sound signal.

Advantages of the Invention

According to the present invention, the noise suppression device can prevent excessive suppression from being carried out on a sound and can implement high-quality noise suppression.

EMBODIMENTS OF THE INVENTION

Hereafter, in order to explain this invention in greater detail, the preferred embodiments of the present invention will be described with reference to the accompanying drawings.

Embodiment 1

Figure 1:
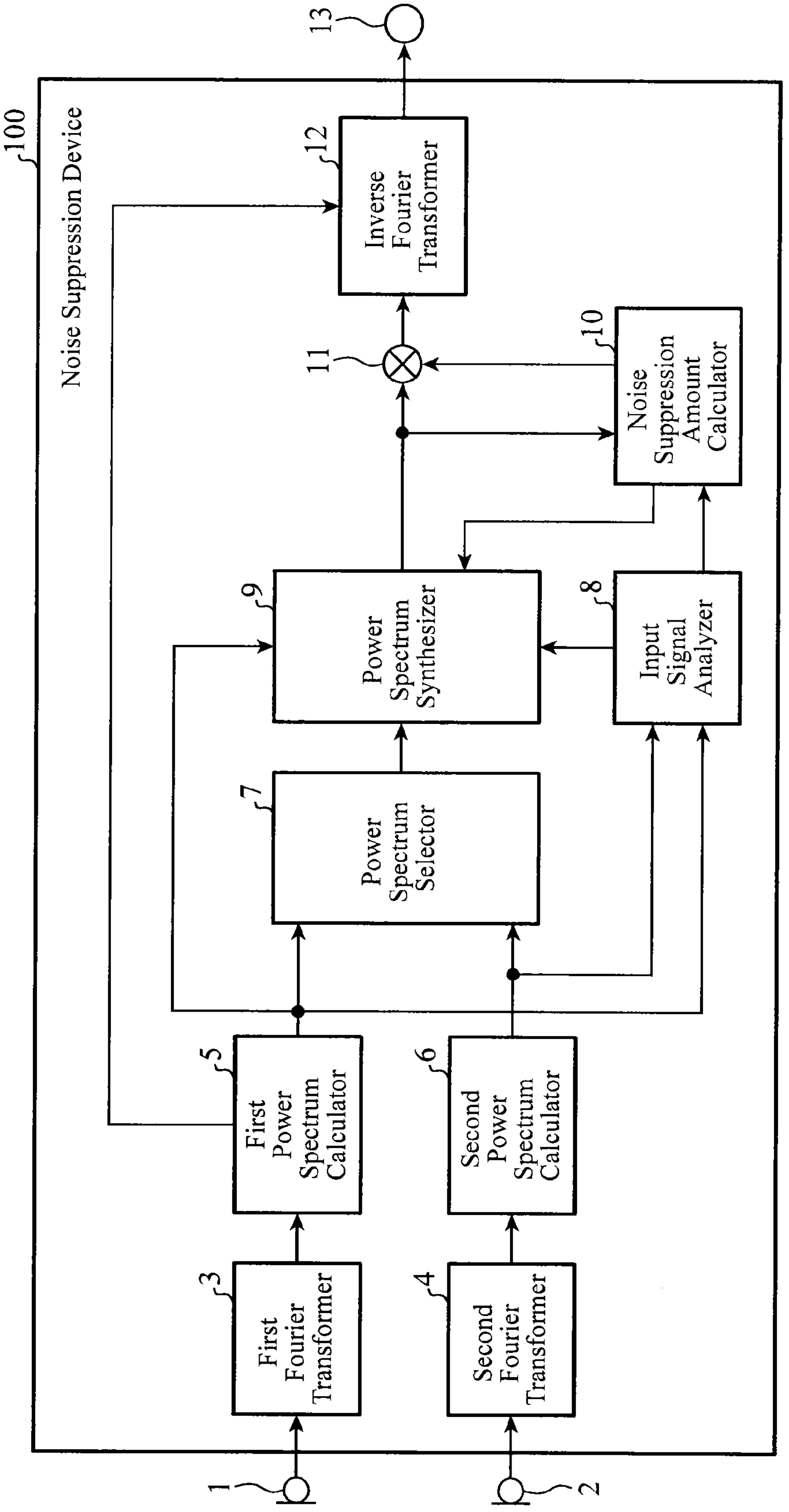
FIG. 1 is a block diagram showing the structure of a noise suppression device in accordance with Embodiment 1.

FIG. 1 is a block diagram showing the structure of a noise suppression device in accordance with Embodiment 1. The noise suppression device 100 to which a first microphone 1 and a second microphone 2 which are input terminals are connected is comprised of a first Fourier transformer 3, a second Fourier transformer 4, a first power spectrum calculator 5, a second power spectrum calculator 6, a power spectrum selector 7, an input signal analyzer 8, a power spectrum synthesizer 9, a noise suppression amount calculator 10, a power spectrum suppressor 11, and an inverse Fourier transformer 12. An output terminal 13 is connected, as a subsequent stage, to the inverse Fourier transformer 12.

Figure 2:
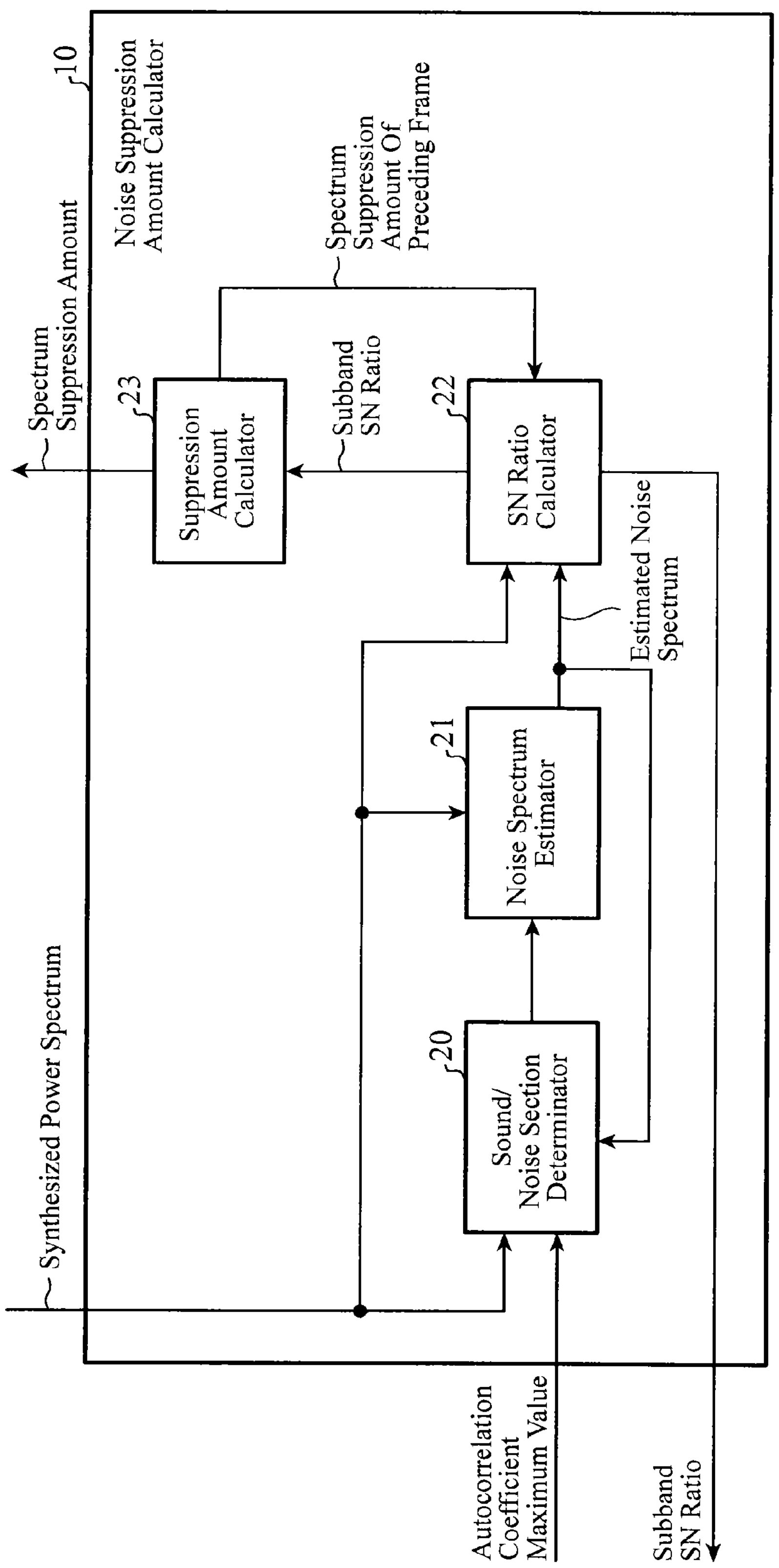
FIG. 2 is a block diagram showing the structure of a noise suppression amount calculator of the noise suppression device in accordance with Embodiment 1.

FIG. 2 is a block diagram showing the structure of the noise suppression amount calculator of the noise suppression device in accordance with Embodiment 1. As shown in FIG. 2, the noise suppression amount calculator 10 is comprised of a sound/noise section determinator 20, a noise spectrum estimator 21, an SN ratio calculator 22, and a suppression amount calculator 23.

Next, the principle behind the operation of the noise suppression device 100 will be explained with reference to FIGS. 1 and 2. In this Embodiment 1, for the sake of simplicity, a case of using two microphones as input terminals will be explained as an example. First, after a sound, such as a voice or music, which is captured by way of the first and second microphones 1 and 2, is A/D (analog-to-digital) converted, the sound is sampled at a predetermined sampling frequency (e.g., 8 kHz) and is divided into parts per frame (e.g., parts per 10 ms), and is then inputted to the noise suppression device 100. In this embodiment, the first microphone 1 is connected to the first Fourier transformer 3 as a microphone (main microphone) which is the nearest to the sound source of the object signal, and inputs a first input signal $x_1(t)$, as a main microphone signal, to the noise suppression device. Further, the second microphone 2 is connected to the second Fourier transformer 4 as another microphone (sub microphone), and inputs a second input signal $x_2(t)$, as a signal of the sub microphone, to the noise suppression device. In the input signals, t shows a sample point number.

The first Fourier transformer 3 and the second Fourier transformer 4 carryout an identical operation. After applying, for example, a Hanning window to the input signals inputted from the first or second microphone 1 or 2, and carrying out a zero filling process on the input signals as needed, the first and second Fourier transformers carry out 256-point fast Fourier transforms on the signals according to, for example, the following equation (1) to transform the first input signal $x_1(t)$ and the second input signal $x_2(t)$, which are signals in a time domain, into a first spectral component $X_1(\lambda, k)$ and a second spectral component $X_2(\lambda, k)$, which are signals in a frequency domain, respectively. The first Fourier transformer outputs the first spectral component $X_1(\lambda, k)$ acquired thereby to the first power spectrum calculator 5, and the second Fourier transformer outputs the second spectral component $X_2(\lambda, k)$ acquired thereby to the second power spectrum calculator 6.

$$X_M(\lambda,k)=FT[x_M(t)];M=1,2 \quad (1)$$

where λ shows a frame number when the input signal is divided into parts per frame, k shows a number specifying a frequency component in a frequency band of a spectrum (referred to as a spectrum number from here on), and M shows a number specifying a microphone, and FT[•] shows the Fourier transform process. Because the Fourier transform is a known method, the explanation of the Fourier transform will be omitted hereafter.

The first power spectrum calculator 5 and the second power spectrum calculator 6 carry out an identical operation. The first and second power spectrum calculators acquire a first power spectrum $Y_1(\lambda, k)$ and a second power spectrum $Y_2(\lambda, k)$ from the spectral components $X_M(\lambda, k)$ of the input signals respectively by using equation (2) which will be shown below. The first power spectrum calculator outputs the first power spectrum $Y_1(\lambda, k)$ acquired thereby to the power spectrum selector 7, the input signal analyzer 8, and the power spectrum synthesizer 9. The second power spectrum calculator outputs the second power spectrum $Y_2(\lambda, k)$ to the power spectrum selector 7 and the input signal analyzer 8. The first power spectrum calculator 5 also calculates, from the first spectral component $X_1(\lambda, k)$, a phase spectrum $\theta_1(\lambda, k)$ which is the phase component of the first spectral component by using equation (3) which will be shown below, and outputs the phase spectrum to the inverse Fourier transformer 12 which will be mentioned below.

$$Y_M(\lambda, k) = \sqrt{\mathrm{Re}\{X_M(\lambda, k)\}^2 + \mathrm{Im}\{X_M(\lambda, k)\}^2}\,; \quad 0 \le k < 128, \quad M = 1, 2 \tag{2}$$

$$\theta_1(\lambda, k) = \tan^{-1}\left(\frac{\mathrm{Im}\{X_1(\lambda, k)\}}{\mathrm{Re}\{X_1(\lambda, k)\}}\right); \quad 0 \le k < 128 \tag{3}$$

where $\mathrm{Re}\{X_M(\lambda, k)\}$ and $\mathrm{Im}\{X_M(\lambda, k)\}$ show the real part and the imaginary part of the input signal spectrum on which the Fourier transform is performed respectively.

The power spectrum selector 7 receives the first power spectrum $Y_1(\lambda, k)$ and the second power spectrum $Y_2(\lambda, k)$, compares the magnitudes of the first power spectrum and the second power spectrum with each other for each spectrum number by using the next equation (4), and selects one of the first and second power spectra having a larger magnitude and generates a synthesized power spectrum candidate $Y_{cand}(\lambda, k)$. The power spectrum selector outputs the synthesized power spectrum candidate $Y_{cand}(\lambda, k)$ generated thereby to the power spectrum synthesizer 9.

$$Y_{cand}(\lambda, k) = \begin{cases} A \cdot Y_1(\lambda, k), & \text{if } \tilde{Y}_2(\lambda, k) \ge A \cdot Y_1(\lambda, k) \\ \tilde{Y}_2(\lambda, k), & \text{if } A \cdot Y_1(\lambda, k) > \tilde{Y}_2(\lambda, k) > Y_1(\lambda, k) \\ Y_1(\lambda, k), & \text{else;} \end{cases} \quad 0 \le k < 128 \tag{4}$$

In this equation, A is a coefficient having a predetermined positive value, and operates as a limiter. Because there is a high possibility that the second power spectrum component is noise other than the object signal when the second power spectrum component has a very large magnitude compared with the first power spectrum component, the incorporation of the limiter process as shown in the equation (4) can prevent a mistaken replacing process from being performed and hence can prevent quality degradation. Although A=4.0 is desirable in this Embodiment 1, A can be changed properly according to the states of the object signal and noise.

$\tilde{Y}_2(\lambda, k)$ in the equation (4) is normalized in such a way that the energy of the second power spectrum becomes equal to that of the first power spectrum, and is calculated according to equation (5) which will be shown below.

$$\tilde{Y}_2(\lambda, k) = \sqrt{\frac{E(Y_1(\lambda))}{E(Y_2(\lambda))}} \cdot Y_2(\lambda, k); \quad 0 \le k < 128 \tag{5}$$

where $E(Y_1(\lambda))$ and $E(Y_2(\lambda))$ are an energy component of the first power spectrum and an energy component of the second power spectrum respectively.

The input signal analyzer 8 receives the power spectrum $Y_1(\lambda, k)$ outputted from the first power spectrum calculator 5 and the power spectrum $Y_2(\lambda, k)$ outputted from the second power spectrum calculator 6, and calculates autocorrelation coefficients as the harmonic structure of each of the power spectra and an index showing the degree of periodicity of each of the input signals of the current frame.

Figure 3:
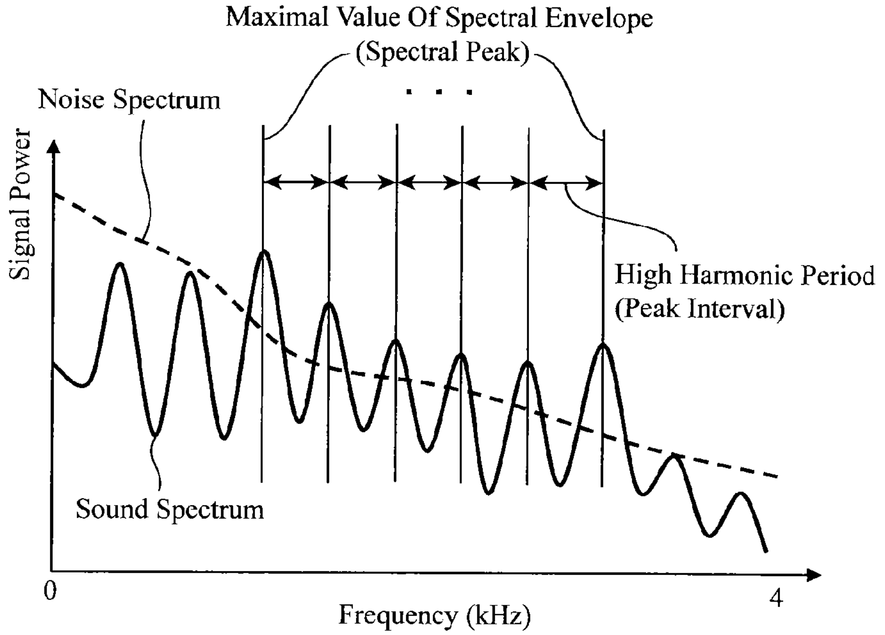
FIG. 3 is an explanatory drawing showing analysis of a harmonic structure by the noise suppression device in accordance with Embodiment 1.

The analysis of the harmonic structure can be carried out by detecting peaks of the harmonic structure (referred to as spectral peaks from here on) which a power spectrum as shown in, for example, FIG. 3 forms. Concretely, in order to remove a minute peak component unrelated to the harmonic structure, after, for example, a value equal to 20 percent of the largest value of the power spectrum is subtracted from each power spectrum component, each maximum value of the spectral envelope of the power spectrum is determined by tracking the value of the spectral envelope in order starting from a low-frequency range. In the example of the power spectrum shown in FIG. 3, although a sound spectrum and a noise spectrum are different components for the sake of simplicity, a noise spectrum is superimposed on (added to) a sound spectrum in an actual input signal and a peak of the sound spectrum having power smaller than that of the noise spectrum cannot be observed.

Figure 4:
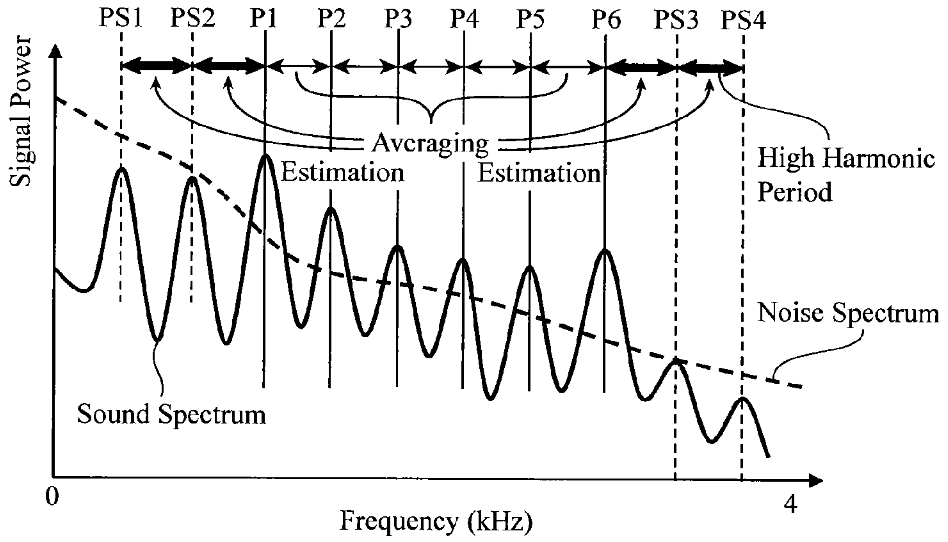
FIG. 4 is an explanatory drawing showing estimation of a spectral peak by the noise suppression device in accordance with Embodiment 1.

After a search for a spectral peak is made, when a maximum value of the power spectrum (this value corresponds to a spectral peak) is found for each spectrum number k, the periodicity information $p_M(\lambda, k)$ is set to 1 for the spectrum number; otherwise, the periodicity information $p_M(\lambda, k)$ is set to zero for the spectrum number. Although all spectral peaks are extracted in the example of FIG. 3, the extraction can be limited to a specific frequency band, e.g., a band having a high SN ratio. Next, as shown in FIG. 4, on the basis of the periodical structure of spectral peaks P1, P2, . . . , and P6 which are observed, peaks PS1, PS2, PS3, and PS4 of the sound spectrum which are buried in the noise spectrum are estimated. Concretely, the average (average peak interval) of the cycle intervals (peak intervals) of the observed spectral peaks is calculated as shown in, for example, FIG. 4, and it is assumed that spectral peaks exist at the determined average peak intervals in a section in which no spectral peak is observed (a low-frequency region part or a high-frequency region part in which the sound is buried in noise) and the periodicity information $p_M(\lambda, k)$ of the spectrum number is set to 1. Because it is rare that a sound component exists in a very low frequency band (e.g., a band of 120 Hz or less), it is possible not to set the periodicity information $p_M(\lambda, k)$ to "1" for the band. The same process can be carried out also for a very high frequency band. The above-mentioned process is carried out on each of the first and second power spectra to determine first periodicity information $p_1(\lambda, k)$ and second periodicity information $p_2(\lambda, k)$ for the first and second power spectra respectively.

Next, from the first power spectrum $Y_1(\lambda, k)$ and the second power spectrum $Y_2(\lambda, k)$, their respective normalized autocorrelation coefficients $\tilde{\rho}_M(\lambda, \tau)$ are determined by using equation (6) which will be shown below.

$$\rho_M(\lambda, \tau) = FT[Y_M(\lambda, k)];\ M = 1, 2 \qquad (6)$$

$$\tilde{\rho}_M(\lambda, \tau) = \frac{\rho_M(\lambda, \tau)}{\rho_M(\lambda, 0)};\ M = 1, 2$$

where $\tau$ is a delay time and FT[•] shows a Fourier transform process. For example, what is necessary is just to carry out a fast Fourier transform with the number of points=256 which is the same as that in the above-mentioned equation (1). Because the above-mentioned equation (6) is based on the Wiener-Khintchine theorem, the explanation of the equation will be omitted hereafter. Next, a maximum value $\tilde{\rho}_{M\_max}(\lambda)$ of the normalized autocorrelation coefficient is calculated by using equation (7) which will be shown below. The equation (7) means that the maximum value $\tilde{\rho}_M(\lambda, \tau)$ is retrieved from the range of $16 \le \tau \le 96$, and the retrieving range can be properly adjusted according to the types and the frequency characteristics of the object signal and noise.

$$\rho_{M\_max}(\lambda) = \max[\tilde{\rho}_M(\lambda, \tau)], 16 \le \tau \le 96, M = 1, 2 \qquad (7)$$

The first periodicity information $p_1(\lambda, k)$ and the second periodicity information $p_2(\lambda, k)$ which are acquired as above, and a first autocorrelation coefficient maximum value $\rho_{1\_max}(\lambda)$ and a second autocorrelation coefficient maximum value $\rho_{2\_max}(\lambda)$ are outputted to the power spectrum synthesizer 9 as input signal analysis results. Further, the first autocorrelation coefficient maximum value $\rho_{1\_max}(\lambda)$ is also outputted to the noise suppression amount calculator 10. For the analysis of the harmonic structure and the periodicity, not only the above-mentioned power spectrum peak analysis and the autocorrelation function method, but also a known method, such as a cepstrum analysis, can be used.

The power spectrum synthesizer 9 synthesizes a power spectrum from the first power spectrum $Y_1(\lambda, k)$ and the synthesized power spectrum candidate $Y_{cand}(\lambda, k)$ on the basis of the input signal analysis results outputted by the input signal analyzer 8 by using equation (8) as will be shown below, and outputs the synthesized power spectrum $Y_{syn}(\lambda, k)$.

$$\tilde{Y}_{syn}(\lambda, k) = \begin{cases} \begin{cases} Y_{cond}(\lambda, k), & \text{if } p_1(\lambda, k) = 1 \text{ and } p_2(\lambda, k) = 1 \\ Y_1(\lambda, k) \end{cases} \\ Y_1(\lambda, k), & snr_{ave}(\lambda) < SNR_{TH}, \end{cases} \qquad (8)$$

$$snr_{ave}(\lambda) \ge SNR_{TH};$$

$$0 \le k < 128$$

In this equation, $snr_{ave}(\lambda)$ shows an average SN ratio (average of subband SN ratios) of the current frame calculated from the subband SN ratios $snr_{sb}(\lambda)$ outputted by the noise suppression amount calculator 10 which will be mentioned below, and can be calculated according to equation (9) which will be shown below. Further, $SNR_{TH}$ shows a predetermined constant threshold. When the average $snr_{ave}(\lambda)$ of the subband SN ratios is less than $SNR_{TH}$, there is a high possibility that the current frame is a noise section, and this means that a synthesizing process using the synthesized power spectrum candidate $Y_{cand}(\lambda, k)$ is not carried out. More specifically, for a noise section, no replacing process using the synthesized power spectrum candidate is carried out and the first power spectrum is outputted as a synthesized spectrum, just as it is, thereby being able to prevent any unnecessary power spectrum synthesizing process from being performed, and hence being able to prevent quality degradation (e.g., a noise level increase and addition of an unnecessary noise signal). Although $SNR_{TH}$=6 (dB) is preferable in this Embodiment 1, $SNR_{TH}$ can be changed properly according to the states and the frequency characteristics of the object signal and noise.

$$snr_{ave}(\lambda) = \frac{1}{128}\sum_{k=0}^{127} snr_{sb}(\lambda, k) \qquad (9)$$

Further, although the process of replacing a power spectrum component using both the first periodicity information $p_1(\lambda, k)$ and the second periodicity information $p_2(\lambda, k)$ is carried out at the time of synthesizing the power spectra according to the above-mentioned equation (8), the replacing process is not limited to this example. For example, only the first periodicity information $p_1(\lambda, k)$ can be alternatively used in the replacing process, or only the second periodicity information $p_2(\lambda, k)$ can be alternatively used in the replacing process. This example is effective particularly when the sound source of the object signal is closer to one of the microphones. For example, a process of switching between the pieces of periodicity information according to the distance between a microphone and the object signal, such as a process of performing a power spectrum synthesis by using the first periodicity information $p_1(\lambda, k)$ when the sound source of the object signal is closer to the first microphone, can be carried out. In contrast with this, a process of switching between the pieces of periodicity information can also be carried out according to the distance between a microphone and the sound source of noise, and, in this case, a process inverse to that in the case of the switching based on the object signal can be carried out. More specifically, when the sound source of noise approaches the first microphone, a power spectrum synthesis can be carried out by using the second periodicity information $p_2(\lambda, k)$. As an alternative, either the first periodicity information or the second periodicity information can be used properly for each frequency according to the frequency characteristics or the like of the object signal and noise. For example, the first periodicity information is used for a low frequency band of 500 Hz or less while the second periodicity information is used for a frequency band higher than the low frequency band. As mentioned above, better noise suppression can be carried out by using the periodicity information which is the result of analyzing the state of the object signal with a higher degree of precision for the power spectrum synthesis.

Figure 5:
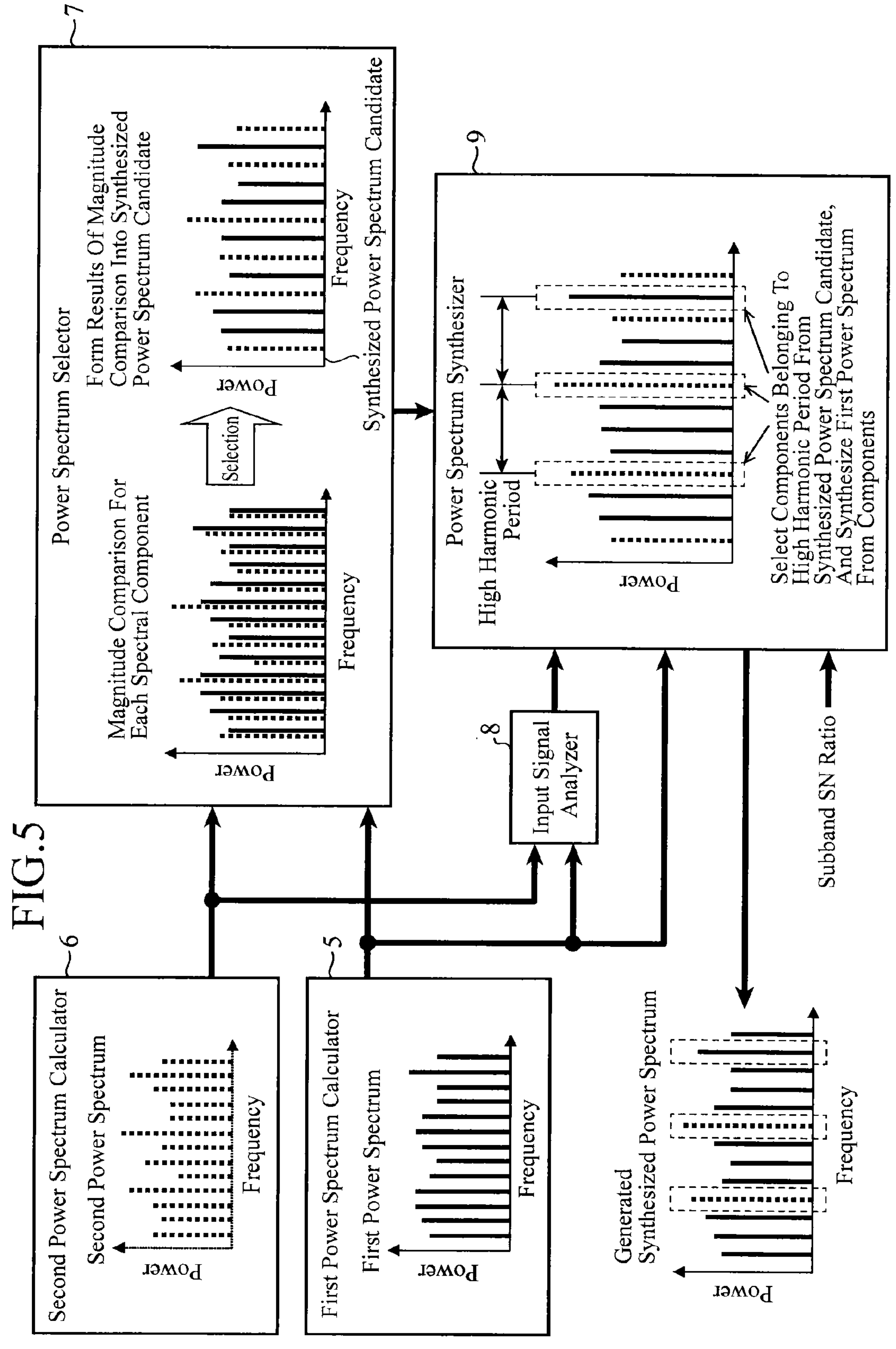
FIG. 5 is a diagram schematically showing a flow of the operation of the noise suppression device in accordance with Embodiment 1.

FIG. 5 schematically shows a flow of a series of operations carried out by the first power spectrum calculator 5 and the second power spectrum calculator 6, the power spectrum selector 7, the input signal analyzer 8, and the power spectrum synthesizer 9 as a supplementary explanation of the operation of each of the above-mentioned structural components.

The noise suppression amount calculator 10 receives the synthesized power spectrum $Y_{syn}(\lambda, k)$, and calculates an amount of noise suppression and outputs this amount of noise suppression to the power spectrum suppressor 11. Hereafter, the internal structure of the noise suppression amount calculator 10 will be explained by using FIG. 2.

The sound/noise section determining unit 20 receives the synthesized power spectrum $Y_{syn}(\lambda, k)$ outputted by the power spectrum synthesizer 9, the first autocorrelation function maximum value $\rho_{1\_max}(\lambda)$ outputted by the input signal analyzer 8, and an estimated noise spectrum $N(\lambda, k)$ outputted by the noise spectrum estimator 21 which will be mentioned below, determines whether each input signal of the current frame is a sound or noise, and outputs the result of the determination as a determination flag. In a method of determining whether each input signal of the current frame is a sound or noise section, when one or both of equations (10) and (11) which will be shown below are satisfied, the sound/noise section determining unit determines that each input signal of the current frame is a sound and sets the determination flag Vflag to "1 (sound)," otherwise, the sound/noise section determining unit determines that each input signal of the current frame is noise and sets the determination flag Vflag to "0 (noise)."

$$Vflag = \begin{cases} 1; & \text{if } 20 \cdot \log_{10}(S_{pow} / N_{pow}) > TH_{FR\_SN} \\ 0; & \text{if } 20 \cdot \log_{10}(S_{pow} / N_{pow}) \le TH_{FR\_SN} \end{cases} \quad (10)$$

$$\text{where } S_{pow} = \sum_{k=0}^{127} Y_{syn}(\lambda, k),\ N_{pow} = \sum_{k=0}^{127} N(\lambda, k)$$

$$Vflag = \begin{cases} 1; & \text{if } \rho_{1\_max}(\lambda) > TH_{ACF} \\ 0; & \text{if } \rho_{1\_max}(\lambda) \le TH_{ACF} \end{cases} \quad (11)$$

In the equation (10), $N(\lambda, k)$ shows the estimated noise spectrum, and $S_{pow}$ and $N_{pow}$ show the sum total of synthesized power spectra and the sum total of estimated noise spectra respectively.

Further, $TH_{FR\_SN}$ and $TH_{ACF}$ show predetermined constant thresholds for determination respectively. In a preferable example, $TH_{FR\_SN}$=3 (dB) and $TH_{AcF}$=0.3. They can also be changed properly according to the state of the input signal and the noise level.

In the determining process of determining whether each input signal of the current frame is a sound or noise section in accordance with this Embodiment 1, the first autocorrelation coefficient maximum value $\rho_{1\_max}(\lambda)$ outputted by the input signal analyzer 8 is used as a parameter. As an alternative, for example, by using the synthesized power spectrum $Y_{syn}(\lambda, k)$ outputted by the power spectrum synthesizer 9, a maximum value of the autocorrelation coefficient can be calculated and can be used instead of the first autocorrelation coefficient maximum value. Because the recalculation of the autocorrelation coefficient from the synthesized power spectrum in which the sound periodical structure is corrected improves the sound section detection accuracy, there is provided an advantage of improving below-mentioned noise spectrum estimation accuracy and hence improving the quality of the noise suppression device.

The noise spectrum estimator 21 receives the synthesized power spectrum $Y_{syn}(\lambda, k)$ outputted by the power spectrum synthesizer 9 and the determination flag Vflag outputted by the sound/noise section determining unit 20, carries out an estimation and an update of a noise spectrum according to equation (12), which will be shown below, and the determination flag Vflag, and outputs the estimated noise spectrum $N(\lambda, k)$.

$$N(\lambda, k) = \begin{cases} \alpha \cdot N(\lambda-1, k) + (1-\alpha) \cdot |Y_{syn}(\lambda, k)|^2 & \text{if } Vflag = 0 \\ N(\lambda-1, k) & \text{if } Vflag = 1; \end{cases} \quad (12)$$

$$0 \le k < 128$$

In this equation, $N(\lambda-1, k)$ shows the estimated noise spectrum for the preceding frame, and is held in a storage, such as a RAM (Random Access Memory), in the noise spectrum estimator 21. In the case of the determination flag Vflag=0 in the above-mentioned equation (12), the estimated noise spectrum $N(\lambda-1, k)$ of the preceding frame is updated by using the synthesized power spectrum $Y_{syn}(\lambda, k)$ and an update coefficient $\alpha$ because each input signal of the current frame is determined to be noise. The update coefficient $\alpha$ is a predetermined constant in the range of $0<\alpha<1$. $\alpha=0.95$ in a preferable example. The update coefficient $\alpha$ can be changed properly according to the state of the input signal and the noise level. In contrast, in the case of the determination flag Vflag=1, each input signal of the current frame is a sound, the estimated noise spectrum $N(\lambda-1, k)$ of the preceding frame is outputted as the estimated noise spectrum $N(\lambda, k)$ of the current frame, just as it is.

The SN ratio calculator 22 calculates a posteriori SNR and a prior SNR for each spectral component by using the synthesized power spectrum $Y_{syn}(\lambda, k)$ outputted by the power spectrum synthesizer 9, the estimated noise spectrum $N(\lambda, k)$ outputted by the noise spectrum estimator 21, and a spectrum suppression amount $G(\lambda-1, k)$ of the preceding frame outputted by the suppression amount calculator 23 which will be mentioned below. The SN ratio calculator can determine the a posteriori SNR$\gamma(\lambda, k)$ by using the synthesized power spectrum $Y_{syn}(\lambda, k)$ and the estimated noise spectrum $N(\lambda, k)$ according to equation (13) which will be shown below.

$$\gamma(\lambda, k) = \frac{|Y_{syn}(\lambda, k)|^2}{N(\lambda, k)}; \quad (13)$$

$$0 \le k < 128$$

The SN ratio calculator can also determine the a prior SNR$\xi(\lambda, k)$ by using the spectrum suppression amount $G(\lambda-1, k)$ of the preceding frame and the a posteriori SNR$\gamma(\lambda-1, k)$ of the preceding frame according to equation (14) which will be shown below.

$$\xi(\lambda, k) = \delta \cdot \gamma(\lambda-1, k) \cdot G^2(\lambda-1, k) + (1-\delta) \cdot F[\gamma(\lambda, k) - 1]; \quad (14)$$

$$0 \le k < 128$$

where $$F[x] = \begin{cases} x, & x > 0 \\ 0, & \text{else} \end{cases}$$

In this equation, $\delta$ is a predetermined constant in the range of $0<\delta<1$, and $\delta=0.98$ is preferable in this Embodiment 1. Further, F[•] means half wave rectification, and floors the a posteriori SNR to zero when the a posteriori SNR is a negative value expressed in decibels.

The SN ratio calculator outputs the a posteriori SNR$\gamma(\lambda, k)$ and the a prior SNR$\xi(\lambda, k)$ which the SN ratio calculator has acquired in the above-mentioned way to the suppression quantity calculator 23 while outputting the a prior SNR$\xi(\lambda,$ k), as an SN ratio for each spectral component (subband SN ratio $snr_{sb}(\lambda, k)$), to the power spectrum synthesizer 9.

The suppression amount calculator 23 calculates the spectrum suppression amount G(λ, k) which is an amount of noise suppression for each spectrum from the a prior SNR (λ, k) and the a posteriori SNRγ(λ, k), which are outputted by the SN ratio calculator 22, and outputs the spectrum suppression amount to the power spectrum suppressor 11.

As a method of calculating the spectrum suppression amount G(λ, k), for example, an MAP method (Maximum A Posteriori method) can be applied. The MAP method is a method of estimating the spectrum suppression amount G(λ, k) by assuming that the noise signal and the sound signal have a Gaussian distribution. According to the MAP method, a magnitude spectrum and a phase spectrum which maximize a conditional probability density function are determined by using the a prior SNRξ(λ, k) and the a posteriori SNRγ(λ, k), and their values are used as estimated values. The spectrum suppression amount can be expressed by equation (15) which will be shown below, where nu and mu which determine the shape of the probability density function are set as parameters. As to the details of a method of determining the spectrum suppression amount for use in the MAP method, the following reference 1 is referred to and the explanation of the details of the method will be omitted hereafter.

$$G(\lambda, k) = u(\lambda, k) + \sqrt{u^2(\lambda, k) + \frac{v}{2\gamma(\lambda, k)}} \quad (15)$$

$$u(\lambda, k) = \frac{1}{2} - \frac{\mu}{4\sqrt{\gamma(\lambda, k)\xi(\lambda, k)}};$$

$$0 \le k < 128$$

[Reference 1]

T. Lotter, P. Vary, "Speech Enhancement by MAP Spectral Amplitude Using a Super-Gaussian Speech Model", EURASIP Journal on Applied Signal Processing, pp. 1110-1126, No. 7, 2005

The power spectrum suppressor 11 carries out suppression on each synthesized power spectrum $Y_{syn}(\lambda, k)$ according to equation (16) which will be shown below to determine a power spectrum S(λ, k) on which the power spectrum suppressor has carried out noise suppression, and outputs this power spectrum to the inverse Fourier transformer 12.

$$S(\lambda,k)=G(\lambda,k)\cdot Y_{syn}(\lambda,k);0\le k<128 \quad (16)$$

The inverse Fourier transformer 12 receives the phase spectrum $\theta_1(\lambda, k)$ outputted by the first power spectrum calculator 5 and the power spectrum S(λ, k) on which the noise suppression is carried out, and, after transforming the signals in a frequency domain into a signal in a time domain and superimposing this signal onto the output signal of the preceding frame to generate a signal, outputs this signal from the output terminal 13 as a sound signal s(t) on which the noise suppression is carried out.

Figure 6:
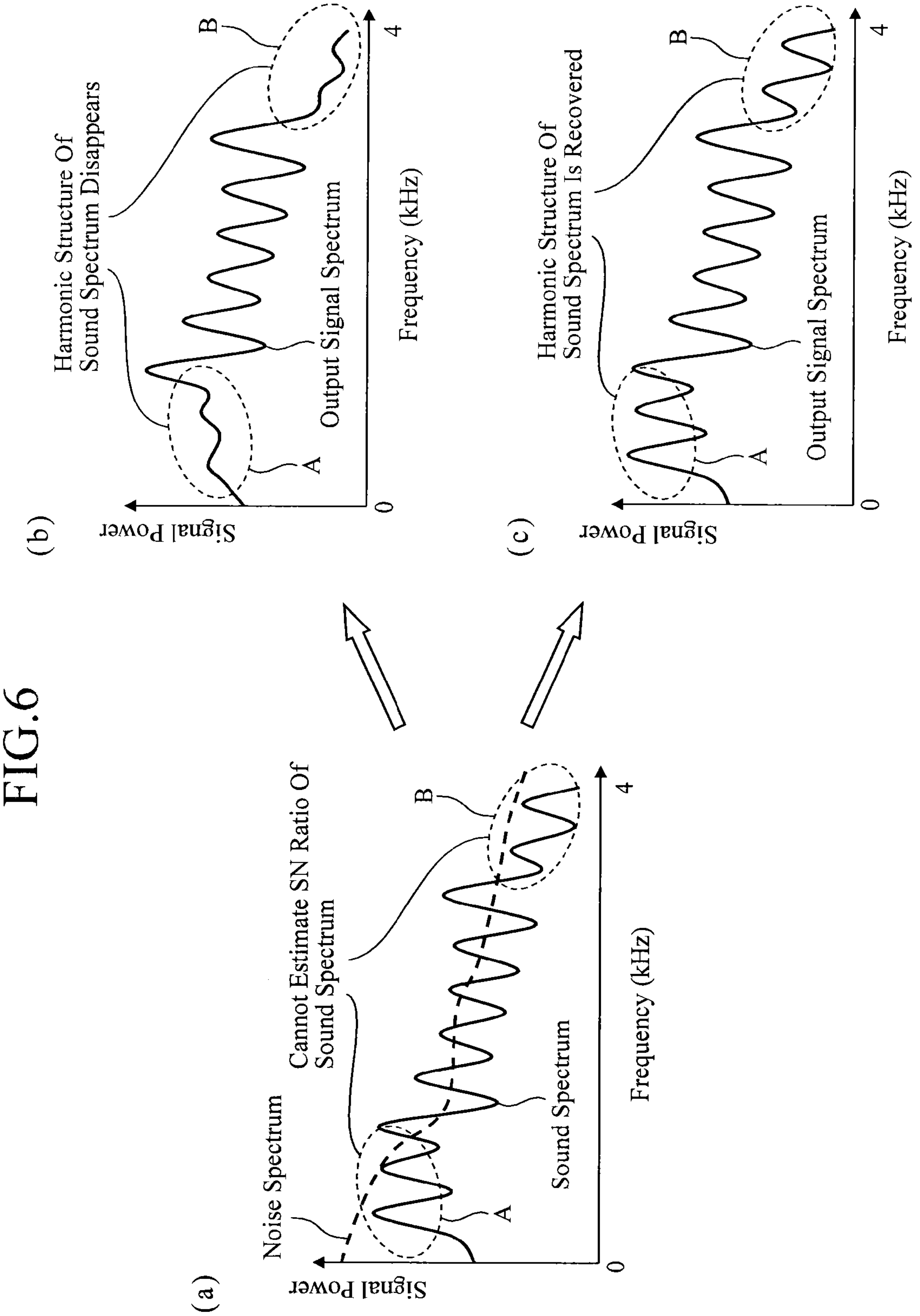
FIG. 6 is an explanatory drawing showing an example of an output result of the noise suppression device in accordance with Embodiment 1.

Further, FIG. 6 is an explanatory drawing showing an example of the output result of the noise suppression device in accordance with this Embodiment 1, and schematically shows the spectrum of the output signal in a sound section. FIG. 6(*a*) shows an example of an input signal spectrum (only the first power spectrum). A solid line shows a sound spectrum and a dotted line shows a noise spectrum. In this example, a part of a low-frequency region (region A) and a part of a high-frequency region (region B) are buried in noise, so that the S/N ratio of the sound spectrum of each of the parts buried in the noise cannot be estimated, and this results in a factor of sound quality degradation.

FIG. 6(*b*) shows an output result provided by a conventional noise suppression method when the spectrum shown in FIG. 6(*a*) is inputted as an input signal, and FIG. 6(*c*) is a diagram showing the output result provided by the noise suppression device 100 in accordance with this Embodiment 1. In each of FIGS. 6(*b*) and 6(*c*), a solid line shows an output signal spectrum. Referring to FIG. 6(*b*), the harmonic structure of a sound in bands (in a region A and in a region B) in each of which the sound is buried in noise disappears. In contrast with this, referring to FIG. 6(*c*), it can be seen that the harmonic structure of the sound in the bands (in the region A and in the region B) in each of which the sound is buried in noise is recovered, and good noise suppression is carried out.

As mentioned above, because the noise suppression device in accordance with this Embodiment 1 can make a correction in such a way as to hold the harmonic structure of a sound also in a band in which the sound is buried in noise and the SN ratio has a negative value, and carry out noise suppression, the noise suppression device can prevent excessive suppression from being performed on the sound and carry out high-quality noise suppression.

Further, also when the sound spectrum of the first microphone 1 which is the main microphone is buried in noise, the noise suppression device in accordance with this Embodiment 1 can reproduce a component buried in the noise by using the sound spectrum of the second microphone 2 which is another microphone input, and carry out high-quality noise suppression which prevents excessive suppression from being performed on the sound.

Further, although according to conventional pitch enhancement, there is no other choice but to enhance harmonic components with an identical degree of emphasis, because the noise suppression device in accordance with this Embodiment 1 is constructed in such a way as to carry out a process (power spectrum synthesis) of replacing a spectral component with a spectral component with larger power according to the harmonic structure of the sound, a pitch cycle enhancement effect according to the harmonic structure and the frequency characteristics of the sound is expectable.

Further, because the noise suppression device in accordance with this Embodiment 1 is constructed in such a way as to carry out a process of synthesizing a power spectrum by using an average SN ratio calculated from the power spectrum of an input signal and the estimated noise spectrum, the noise suppression device can prevent an unnecessary synthesis resulting in an increase in the noise, and so on in a noise section and in a band in which the SN ratio is low, and can carry out higher-quality noise suppression.

Although the structure of carrying out a process of synthesizing a power spectrum for about all bands is shown in this Embodiment 1, the present embodiment is not limited to this structure. The noise suppression device can be alternatively constructed in such a way as to carry out the synthesizing process only on a low-frequency or high-frequency band as needed, or can be alternatively constructed in such a way as to carry out the synthesizing process only on a specific frequency band, such as a band ranging from 500 Hz to 800 Hz. Such a correction on a certain frequency band is effective for correction of a sound buried in, for example, narrow-band noise, such as a whizzing sound or an automobile engine sound.

In this Embodiment 1, for the sake of simplicity, the case in which the number of microphones is two is explained as an example. The number of microphones is not limited to two and can be changed properly. For example, in a case in which the number of microphones is three or more, in the comparative evaluation, shown in FIG. 5, of the spectral component magnitudes by the power spectrum selector 7, a power spectrum having a maximum is selected and is determined as a synthesized power spectrum candidate.

Embodiment 2

In above-mentioned Embodiment 1, the process of changing whether or not (ON/OFF) to carry out the power spectrum synthesis using the above-mentioned equation (8) is carried out on the basis of a comparison between the average $snr_{ave}(\lambda)$ of the subband SN ratios, which is shown in the above-mentioned equation (9), and the predetermined threshold $SNR_{TH}$. As an alternative, for example, instead of the process of replacing a spectral component, a process of weighted-averaging a synthesized spectrum candidate and a first power spectrum by using this average $snr_{ave}(\lambda)$ as an index showing the degree of sound likeness of the input signal can be carried out, as a power spectrum synthesizing process with a more-continuous change, for a section in which a sound section transitions to a noise section and for a section (transition section) in which a noise section transitions to a sound section, as shown in equation (17) which will be shown below. In Embodiment 2, this structure will be shown.

Embodiment 1 cannot carry out the power spectrum synthesizing process in a transition region between a sound section and a noise section.

Although the structure of using the average $snr_{ave}(\lambda)$ of the subband SN ratios as the index showing the degree of sound likeness of the input signal is shown in above-mentioned Embodiment 2, the present embodiment is not limited to this structure. For example, the power spectrum synthesizing process can also be controlled according to the correlativity of the input signal (noise=low autocorrelation and sound=high autocorrelation), such as the autocorrelation coefficient maximum value $\rho_{M\_max}(\lambda)$ which is shown in the above-mentioned equation (7). Concretely, by increasing the ratio of the synthesized power spectrum when the correlativity is high, and by decreasing the ratio of the synthesized power spectrum when the correlativity is low, the same advantage can be provided.

Embodiment 3

Although the structure of setting the value of the limiter A to a predetermined constant in the above-mentioned equation (4) is shown in above-mentioned Embodiment 1, a structure of switching between two or more constants according to an index showing the degree of sound likeness of the input signal $$\tilde{Y}_{syn}(\lambda,k)=\begin{cases}\begin{cases}Y_{cond}(\lambda,k), & \text{if Flag}[p_1(\lambda,k),\,p_2(\lambda,k)]=1\\ Y_1(\lambda,k)\end{cases}, & snr_{ave}(\lambda)>SNR_H(k)\\ \begin{cases}\{1-B(\lambda,k)\}\cdot Y_1(\lambda,k)+B(\lambda,k)\cdot Y_{cond}(\lambda,k) & \text{if Flag}[p_1(\lambda,k),\,p_2(\lambda,k)]=1,\\ Y_1(\lambda,k)\end{cases}, & SNR_H(k)\ge snr_{ave}(\lambda)>SNR_L(k)\\ Y_1(\lambda,k), & SNR_L(k)\ge snr_{ave}(\lambda);\end{cases}\tag{17}$$

$$0\le k<128$$

Figure 7:
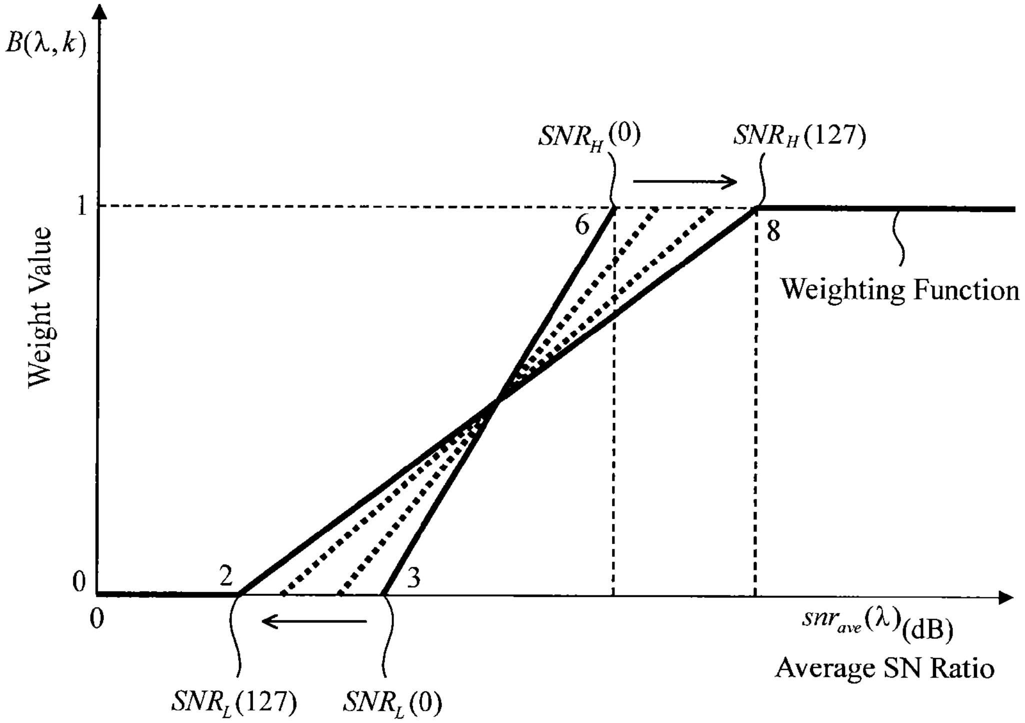
FIG. 7 is an explanatory drawing showing a weighted averaging process by a noise suppression device in accordance with Embodiment 2.

In this equation, $\text{Flag}[p_1(\lambda, k), p_2(\lambda, k)]$ is a logic function of returning "1" when both of two pieces of periodicity information $p_1(\lambda, k)$ and $p_2(\lambda, k)$ are "1." Further, $B(\lambda, k)$ is a predetermined weighting function which is determined in response to the average $snr_{ave}(\lambda)$ of subband SN ratios. In this Embodiment, a setting according to equation (18) which will be shown below is preferable. Further, $SNR_H(k)$ and $SNR_L(k)$ are predetermined thresholds, and are set to values according to the frequency, as shown in FIG. 7. A method of setting the weighting function $B(\lambda, k)$, and the thresholds $SNR_H(k)$ and $SNR_L(k)$ can be changed properly according to the states and the frequency characteristics of the object signal and noise.

$$B(\lambda,k)=\frac{snr_{ave}(\lambda)-SNR_L}{SNR_H-SNR_L}\tag{18}$$

As mentioned above, because the noise suppression device in accordance with this Embodiment 2 is constructed in such a way as to carry out the process of weighted-averaging the synthesized spectrum candidate and the first power spectrum by using the index showing the degree of sound likeness of the input signal, as the power spectrum synthesizing process with a more-continuous change, for a transition section between a sound and noise, instead of the process of replacing a spectral component, the noise suppression device in accordance with this Embodiment 2 can carry out the power spectrum synthesizing process for a transition region, and can also provide a synergistic effect of releasing the discontinuity resulting from the ON/OFF of the power spectrum synthesis in a section between a sound section and a noise section, while the noise suppression device in accordance with above-mentioned to use a constant selected as the value of the limiter, or controlling the value of the limiter by using a predetermined function is shown this Embodiment 3. For example, when the maximum value $\rho_{M\_max}(\lambda)$ of the autocorrelation coefficient in the above-mentioned equation (7), as the index showing the degree of sound likeness of the input signal, i.e., a control factor of the state of the input signal, is large, i.e., when the periodical structure of the input signal is clearly seen (there is a high possibility that the input signal is a sound), the value can be set to a large one; otherwise, the value can be set to a small one. Further, the maximum value $\rho_{M\_max}(\lambda)$ of the autocorrelation coefficient can be used together with the determination flag Vflag outputted by the sound/noise section determining unit 20, and the value can be reduced when the determination flag Vflag shows noise.

By controlling the value of the constant of the limiter according to the state of the input signal, the sound degradation can be reduced with increase in the value of the limiter when there is a high possibility that the input signal is a sound. In contrast, when there is a high possibility that the input signal is noise, by reducing the value of the limiter, the mixing of noise can be lessened and high-quality noise suppression can be carried out.

Further, in a variant of this Embodiment 3, there is no necessity to make the limiter value constant in a frequency direction, and the limiter value can be set to a different value for each frequency. For example, because a lower-frequency sound has a more "clear" harmonic structure (the mountain valley structure of its spectrum is distinctive), as a typical sound characteristic, the value of the limiter can be set to a large one and can be decreased with increase in the frequency.

As mentioned above, because the noise suppression device in accordance with this Embodiment 3 is constructed in such a way as to carry out limiter control which differs for each frequency in the power spectrum selection, the noise suppression device can carry out a power spectrum selection suitable for each frequency of a sound and can further carry out higher-quality noise suppression.

Embodiment 4

Figure 8:
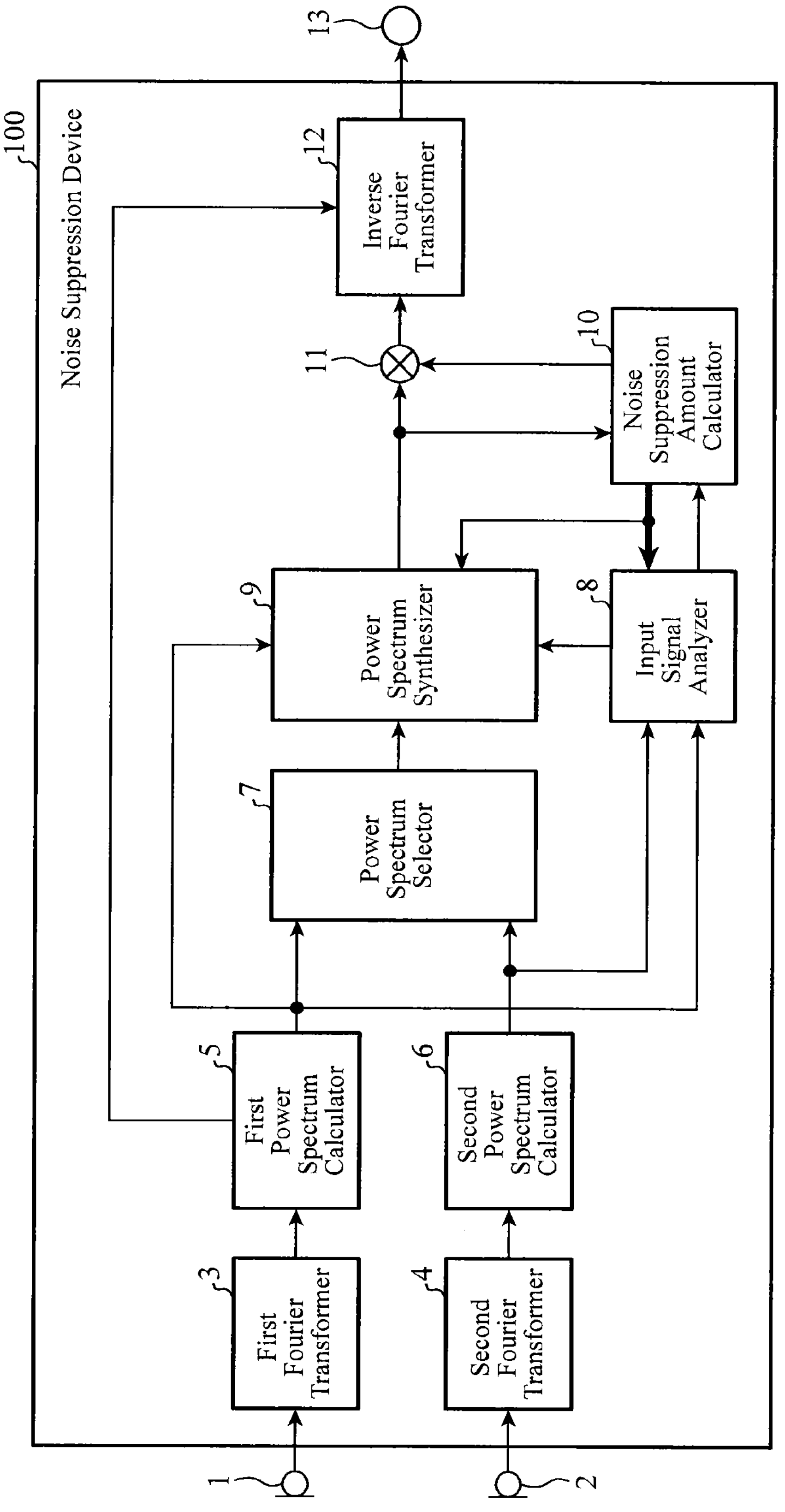
FIG. 8 is a block diagram showing the structure of a noise suppression device in accordance with Embodiment 4.

Although the structure of detecting all spectral peaks for the analysis of the harmonic structure is shown in the explanation of FIG. 3 in above-mentioned Embodiment 1, a structure of detecting spectral peaks only in a band in which subband SN ratios are high will be shown in this Embodiment 4. FIG. 8 is a block diagram showing the structure of a noise suppression device in accordance with Embodiment 4. The noise suppression device 100 in accordance with Embodiment 4 inputs subband SN ratios outputted by an SN ratio calculator 22 which is an internal structural component of a noise suppression amount calculator 10 to an input signal analyzer 8. The input signal analyzer 8 detects spectral peaks only in a band in which an SN ratio is high by using the subband SN ratios inputted thereto.

3 dB is preferable as a threshold, which is expressed as a decibel value, for the subband SN ratios, for example. A spectral peak can be detected by using only a power spectrum component in a band exceeding this threshold. The threshold for the subband SN ratios can be changed properly according to the states and the frequency characteristics of the object signal and noise. Similarly, also when calculating an autocorrelation coefficient, this autocorrelation coefficient can be calculated only in a band in which subband SN ratios are high.

As mentioned above, because the noise suppression device in accordance with this Embodiment 4 is constructed in such a way that the SN ratio calculator 22 inputs the subband SN ratios calculated thereby to the input signal analyzer 8, and the input signal analyzer 8 carries out detection of spectral peaks or calculation of an autocorrelation coefficient only in a band in which the SN ratio is high by using the subband SN ratios inputted thereto, the noise suppression device can improve the accuracy of detection of spectral peaks and the degree of precision with which to determine whether the input signal is a sound or noise section and hence can carry out higher-quality noise suppression.

Embodiment 5

Figure 9:
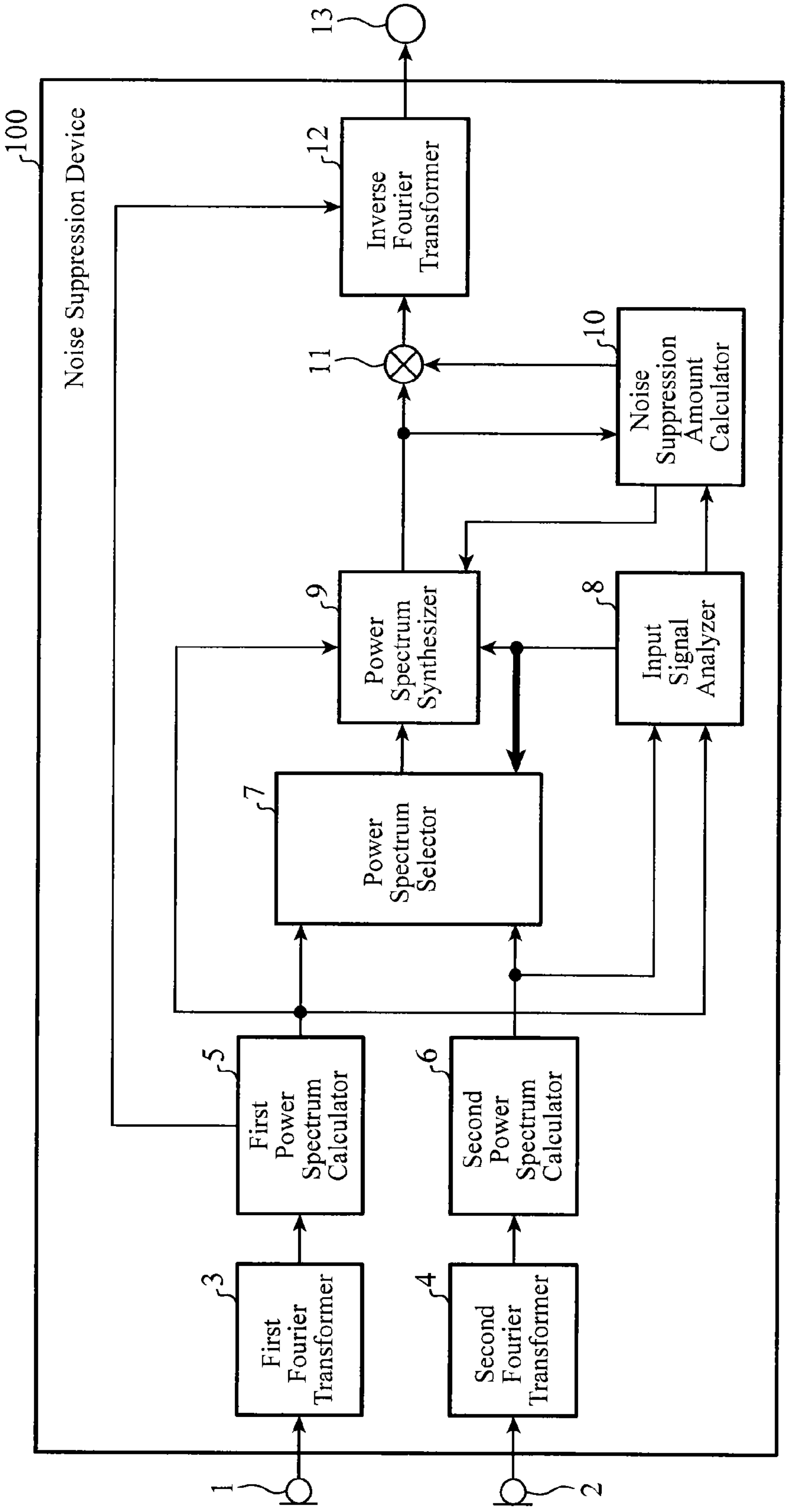
FIG. 9 is a block diagram showing the structure of a noise suppression device in accordance with Embodiment 5.

Although the structure of selecting a power spectrum candidate unconditionally, except for the limiter process, by using the first power spectrum and the second power spectrum in the above-mentioned equation (4) is shown in above-mentioned Embodiment 1, a structure of carrying out an on/off process of being able to change whether or not to perform a power spectrum selection process will be shown in this Embodiment 5. FIG. 9 is a block diagram showing the structure of a noise suppression device in accordance with Embodiment 5. The noise suppression device 100 in accordance with Embodiment 5 inputs a maximum value $\rho_{2\_max}(\lambda)$ of a second autocorrelation coefficient outputted from an input signal analyzer 8 to a power spectrum selector 7. The power spectrum selector 7 carries out an on/off process of changing whether or not to perform a power spectrum selection process on the basis of the maximum value $\rho_{2\_max}(\lambda)$ of the second autocorrelation coefficient, which is inputted thereto. Concretely, when the maximum value $\rho_{2\_max}(\lambda)$ of the second autocorrelation coefficient is less than a predetermined threshold, the power spectrum selector determines that there is a high possibility that a second power spectrum is a power spectrum of a noise signal, skips a selection process according to the above-mentioned equation (8), and outputs a first power spectrum $Y_1(\lambda, k)$ as a synthesized power spectrum candidate $Y_{cand}(\lambda, k)$. While "0.2" is preferable as a threshold used when determining whether or not the second power spectrum is a power spectrum of a noise signal, the threshold can be changed properly according to the states of the object signal and noise, and SN ratios.

As mentioned above, because the noise suppression device in accordance with this Embodiment 5 is constructed in such a way that the power spectrum selector 7 carries out an on/off process of changing whether or not to perform a power spectrum selection process on the basis of the maximum value $\rho_{2\_max}(\lambda)$ of the second autocorrelation coefficient, which is inputted thereto, and, when it is estimated that there is a high possibility that the second power spectrum is a power spectrum of a noise signal, outputs the second power spectrum as a synthesized power spectrum candidate, just as it is, the noise suppression device can prevent any unnecessary power spectrum synthesizing process from being performed, and hence can prevent quality degradation (e.g., an noise level increase and addition of an unnecessary noise signal).

Embodiment 6

Figure 10:
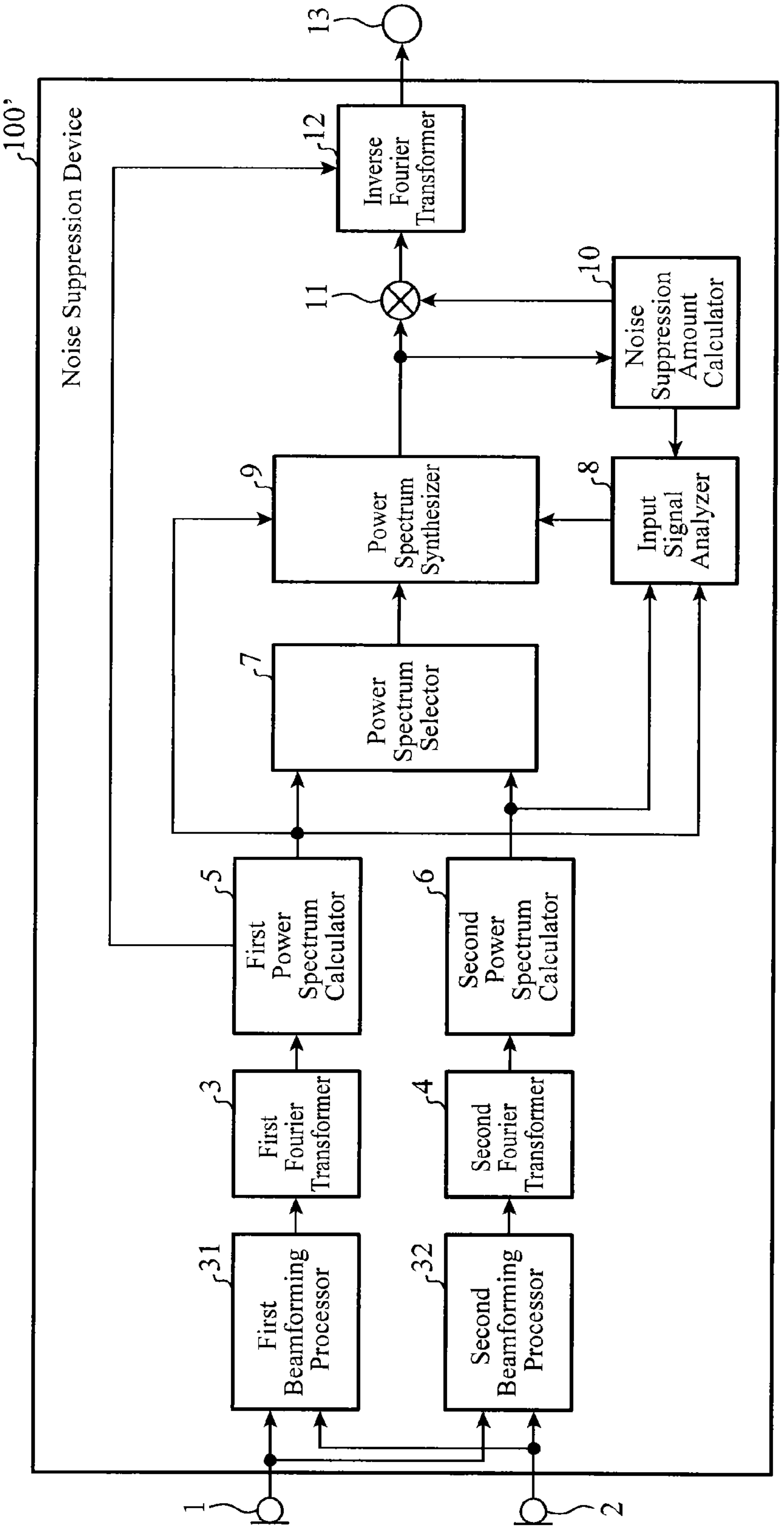
FIG. 10 is a block diagram showing the structure of a noise suppression device in accordance with Embodiment 6.

In this Embodiment 6, a structure of introducing, as a pre-process performed on each microphone, for example, a beamforming process, and providing each microphone with directivity will be explained. FIG. 10 is a block diagram showing the structure of a noise suppression device in accordance with this Embodiment 6. The noise suppression device includes a first beamforming processor 31 and a second beamforming processor 32 in addition to the components of the noise suppression device in accordance with Embodiment 1 shown in FIG. 1. Because the other structural components are the same as those shown in Embodiment 1, the explanation of the structural components will be omitted hereafter.

The first beamforming processor 31 carries out a beamforming process by using a first microphone 1 and a second microphone 2 to provide input signals with directivity, and outputs the signals to a first Fourier transformer 3. Similarly, the second beamforming processor 32 carries out a beamforming process by using the first microphone 1 and the second microphone 2 to provide the input signals with directivity, and outputs the signals to a second Fourier transformer 4. A known method, such as a method disclosed by the above-mentioned nonpatent reference 2 or a Minimum Variance Distortionless Response method, can be applied to the beamforming processes.

Figure 11:
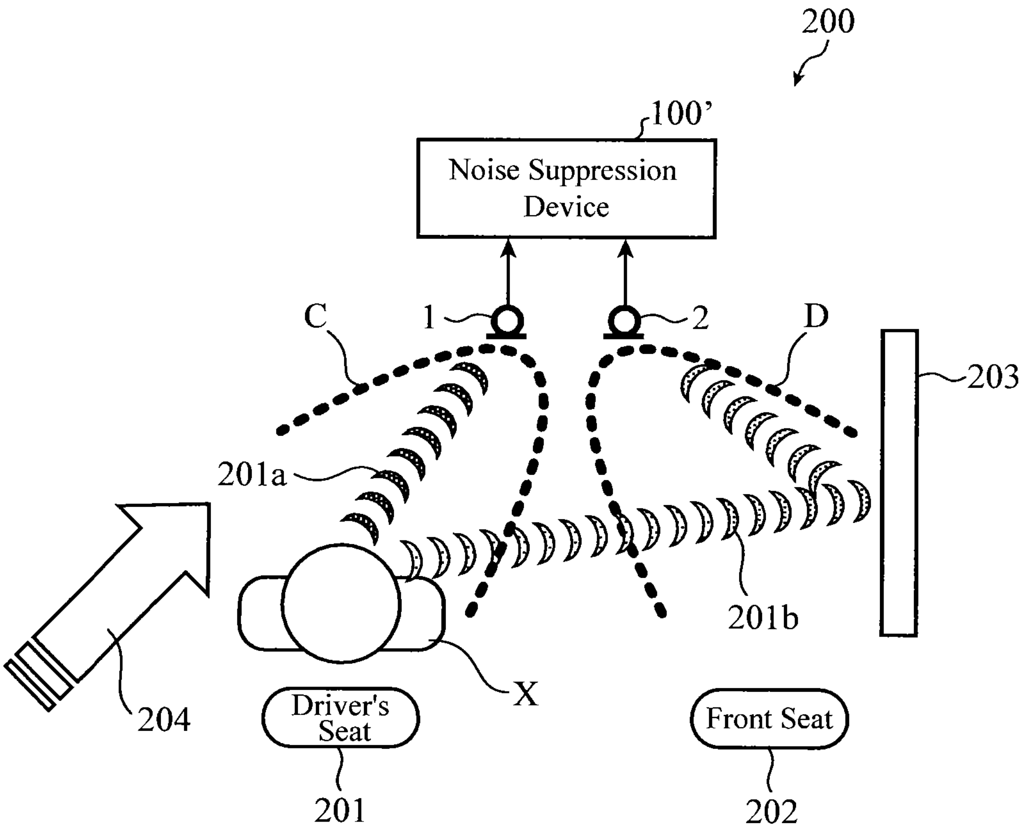
FIG. 11 is an explanatory drawing showing an example of application of a noise suppression device in accordance with Embodiment 6.

FIG. 11 is an explanatory drawing showing an example of the application of the noise suppression device in accordance with Embodiment 6. In the example shown in FIG. 11, a phone call using a handsfree call device in which the noise suppression device 100' is applied to the first and the second microphones 1 and 2 is shown. In this figure, a case in which a speaker X is sitting on a driver's seat 201 of a moving object 200 and is performing a handsfree phone call by using the first and second microphones 1 and 2 is shown. A region C shows the directivity of the first beamforming processing unit 31 and is controlled in such a way as to be oriented toward the driver's seat 201 to acquire the voice of the speaker X on the driver's seat 201, while a region D shows the directivity of the second beamforming processor 32 and is controlled in such a way as to be oriented toward a front seat 202 to acquire the voice of a speaker on the front seat 202.

The first beamforming processor 31 carries out a beamforming process by using the first and second microphones 1 and 2, and outputs the input signals which the first beamforming processor has processed to the first Fourier transformer 3. Similarly, the second beamforming processor 32 carries out a beamforming process by using the first and second microphones 1 and 2, and outputs the input signals which the second beamforming processor has processed to the second Fourier transformer 4. In the example shown in FIG. 11, a direct wave 201*a* caused by an utterance of the speaker X on the driver's seat 201 moves within the region C acquired through the beamforming, and is inputted to the first microphone 1. Further, a reflected and diffracted wave 201*b*, which originates from the utterance of the speaker X and which is reflected by a reflecting surface 203, such as a wall, moves within the region D acquired through the beamforming, and is inputted to the second microphone 2. Noise existing outside the regions C and D is not inputted to the first microphone 1 or the second microphone 2, and hence can be removed.

While a conventional noise suppression device cannot make a sound acquired through the beamforming on the side of the front seat 202 contribute to an improvement in the quality of the noise suppression device, the noise suppression device 100' in accordance with this Embodiment 6 can utilize the voice of the speaker on the driver's seat 201 which is acquired through the beamforming on the side of the front seat 202 as an input to the second microphone 2, and hence can accomplish an improvement in the quality of the noise suppression device.

Although the case in which the beamforming is set for each of the two regions: C on the side of the driver's seat 201 and D on the side of the front seat 202 is shown in above-mentioned Embodiment 6, the present embodiment is not limited to the two regions, and can also be applied to three or more regions. When the beamforming is set for each of the three or more regions, a power spectrum having a maximum is selected and is determined as a synthesized power spectrum candidate in the comparative evaluation of spectral component magnitudes by a power spectrum selector 7.

Embodiment 7

Although the structure of synthesizing a power spectrum on the basis of periodicity information in such a way as to enhance the sound which is the object signal is shown in above-mentioned Embodiments 1 to 6, a process of selecting a power spectrum component having a small value at a valley of the periodicity information, and replacing a power spectrum can be carried out in this Embodiment 7. In the detection of a valley of a spectrum, for example, the median of the spectrum numbers between spectral peaks can be determined as a valley of the spectrum.

As mentioned above, because the noise suppression device in accordance with this Embodiment 7 is constructed in such a way as to carry out a power spectrum synthesis in such a way as to reduce the SN ratio of a valley of a spectrum, the noise suppression device can make the harmonic structure of the sound distinctive, and can carry out higher-quality noise suppression.

Embodiment 8

Although the structure of carrying out the synthesizing process only on concerned spectral components is shown in above-mentioned Embodiments 1 to 7, a spectral component can be replaced by, for example, a spectrum which is obtained by weighted-averaging adjacent periodicity components. For example, the replacing process using the above-mentioned equation (8) or (17) and a predetermined weighting factor can be carried out also on adjacent frequency components of the periodicity information. When the analysis accuracy of the harmonic structure degrades and the spectrum peak positions cannot be determined exactly, such as when the amplitude level of noise is high with respect to the amplitude level of the object signal (the SN ratio is low), the synthesizing process of synthesizing a power spectrum can be carried out.

As mentioned above, because the noise suppression device in accordance with this Embodiment 8 carries out the process of replacing the weighting factors for adjacent frequency components of a periodicity component, the noise suppression device can carry out the synthesizing process of synthesizing a power spectrum and can improve the quality of the noise suppression device also when the analysis accuracy of the harmonic structure degrades and the spectrum peak positions cannot be determined exactly.

Embodiment 9

The output signal on which the noise suppression is carried out by the noise suppression device 100 or 100' which is constructed in such a way as shown in either of above-mentioned Embodiments 1 to 8 is sent out in a digital data form to one of various sound acoustic processors, such as a voice encoding device, a voice recognition device, a voice storage device, and a handsfree call device. As an alternative, the noise suppression device, as well as the above-mentioned other device, can be implemented via software incorporated into a DSP (digital signal processor), or can be constructed as a software program that is executed on a CPU (central arithmetic unit). The program can be constructed in such a way as to be stored in a storage unit of a computer that executes the software program, or can be constructed in a form in which it is distributed as a storage medium, such as a CD-ROM.

Figure 12:
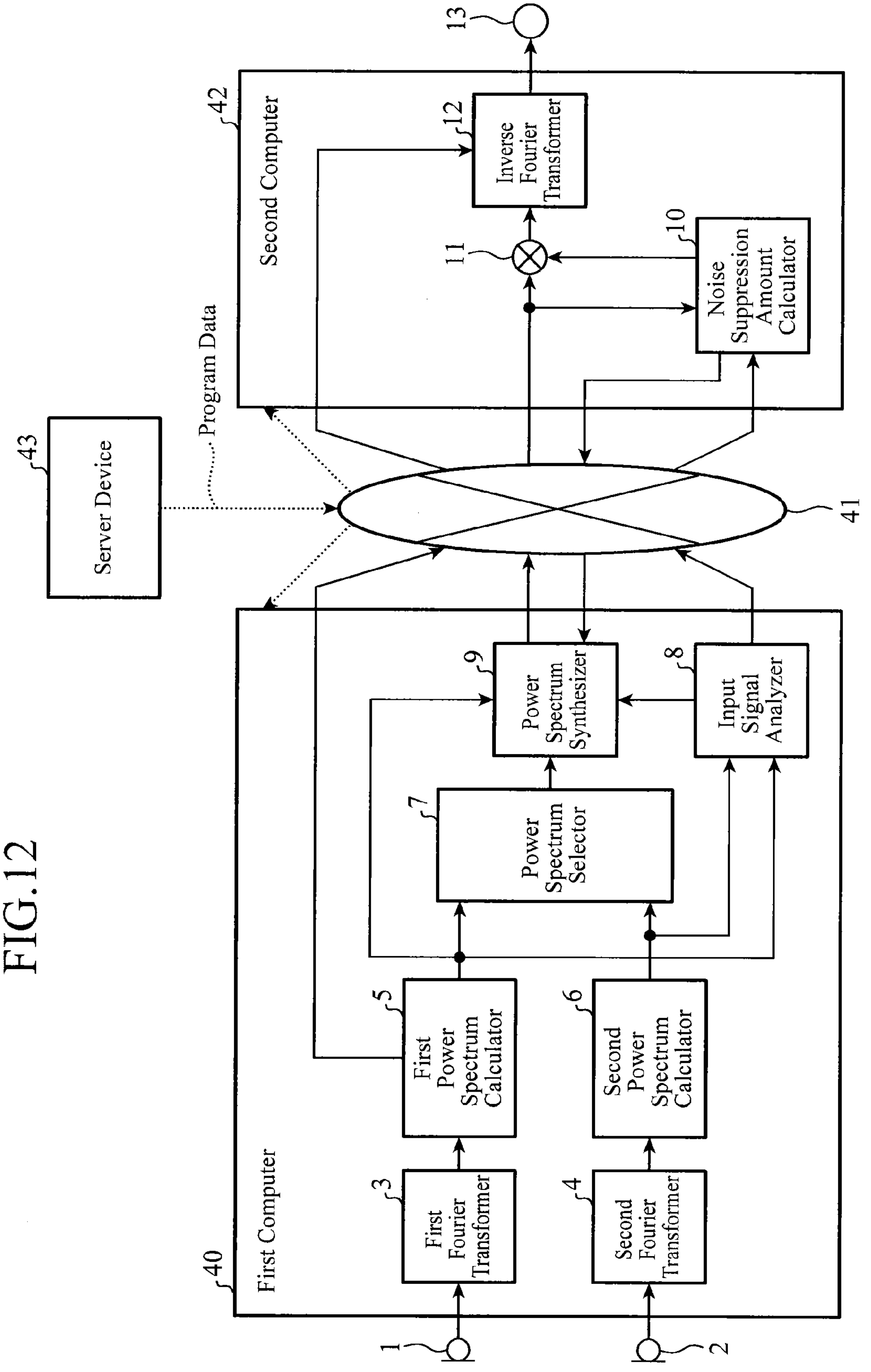
FIG. 12 is a block diagram showing the structure of a noise suppression system in accordance with Embodiment 9.

Further, all or a part of the program can be provided by way of a network. FIG. 12 is a block diagram showing the structure of a noise suppression system in accordance with Embodiment 9, and shows the structure of the noise suppression system that provides a part of the program. As shown in FIG. 12, a first computer 40 includes the first and second Fourier transformers 3 and 4, the first and second power spectrum calculators 5 and 6, the power spectrum selector 7, the input signal analyzer 8, and the power spectrum synthesizer 9, and carries out processes. Data processed by the first computer 40 are sent out to a second computer 42 via, for example, a network device 41 which consists of a cable or wireless network. The second computer 42 includes the noise suppression amount calculator 10, the power spectrum suppressor 11, and the inverse Fourier transformer 12, and carries out processes.

A server device 43 holds the software program for implementing the noise suppression device 100 or 100' in accordance with either of above-mentioned Embodiments 1 to 8, and provides a program module that carries out the processes for each computer via the network device 41 as needed. The first computer 40 or the second computer 42 can serve as the role of the server device 43. For example, in a case in which the second computer 42 serves as the server device 43, the second computer 42 provides the above-mentioned program for the first computer 40 via the network device 41.

As mentioned above, in accordance with this Embodiment 9, there is provided an advantage of being able to easily replace the noise suppression device by a noise suppression device based on a method different from the method described in, for example, any one of above-mentioned Embodiments 1 to 8, and being able to distribute the program over a plurality of computers to make these computers execute the program, thereby being able to reduce the processing load according to the computing power of each of the computers, etc. As an example, in a case in which the first computer 40 is a device for incorporation into another device, such as a car navigation or a mobile phone, and its processing capability is limited, and the second computer 42 is a large-scale server-type computer or the like and its processing capability has a margin, it is possible to cause the second computer 42 to carry out a larger amount of arithmetic processing. In either of the above-mentioned cases, the advantage of improving the quality of the power spectrum synthesizing process, which is mentioned above, is effective while remaining unchanged. Further, in addition to sending out the output to one of various sound acoustic processors, after the output is D/A (digital to analog) converted, the output can be amplified by an amplifying device and outputted as a sound signal directly from a speaker or the like.

Although the explanation is made by using the MAP method as the noise suppression method in any one of above-mentioned Embodiments 1 to 9, these embodiments can also be applied to another method. For example, there are a minimum mean-square error short-time spectral amplitude estimator explained in the above-mentioned nonpatent reference 1 and a spectral subtraction method explained in detail in the following reference 2.

[Reference 2]

S. F. Boll, "Suppression of Acoustic Noise in Speech Using Spectral Subtraction", IEEE Trans. on ASSP, Vol. ASSP-27, No. 2, pp. 113-120, Apr. 1979

Further, although the case of a narrow-band phone (0 Hz to 4000 Hz) is shown in above-mentioned Embodiments 1 to 9, the present invention is not limited to a narrow-band phone voice. For example, the present invention can also be applied to a wide-band phone voice in the range of, for example, 0 Hz to 8000 Hz, and an acoustic signal.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

As mentioned above, the noise suppression device in accordance with the present invention can correct a sound and carry out noise suppression on the sound in such a way as to hold the harmonic structure of the sound also in a band in which the sound is buried in noise, the noise suppression device is suitable for use in noise suppression on various devices in each of which a voice call, a voice storage, and a voice recognition system are introduced.

EXPLANATIONS OF REFERENCE NUMERALS

1 first microphone, 2 second microphone, 3 first Fourier transformer, 4 second Fourier transformer, 5 first power spectrum calculator, 6 second power spectrum calculator, 7 power spectrum selector, 8 input signal analyzer, 9 power spectrum synthesizer, 10 noise suppression amount calculator, 11 power spectrum suppressor, 12 inverse Fourier transformer, 13 output terminal, 20 sound/noise section determinator, 21 noise spectrum estimator, 22 SN ratio calculator, 23 suppression amount calculator, 31 first beamforming processor, 32 second beamforming processor, 40 first computer, 41 network device, 42 second computer, 43 server device, 100 and 100' noise suppression device, 200 moving object, 201 driver's seat, 201*a* direct wave, 201*b* reflected and diffracted wave, 202 front seat, 203 reflecting surface, 204 noise.

The invention claimed is:

1. A noise suppression device comprising:

a Fourier transformer that transforms a plurality of input signals inputted thereto from signals in a time domain to spectral components which are signals in a frequency domain;

a power spectrum calculator that calculates power spectra from the spectral components which are transformed by said Fourier transformer;

an input signal analyzer that analyzes a harmonic structure and periodicity of said input signals on a basis of the power spectra calculated by said power spectrum calculator;

a power spectrum synthesizer that carries out a synthesis from the power spectra of said plurality of input signals according to a result of the analysis by said input signal analyzer to generate a synthesized power spectrum;

a noise suppression amount calculator that calculates an amount of noise suppression on a basis of the synthesized power spectrum generated by said power spectrum synthesizer and an estimated noise spectrum estimated from said input signals;

a power spectrum suppressor that carries out noise suppression on the synthesized power spectrum generated by said power spectrum synthesizer by using the amount of noise suppression calculated by said noise suppression amount calculator; and an inverse Fourier transformer that transforms the synthesized power spectrum on which the noise suppression is carried out by said power spectrum suppressor into a signal in a time domain, and outputs this signal as a sound signal.

2. The noise suppression device according to claim 1, wherein said noise suppression device includes a power spectrum selector that compares spectral components of the power spectra calculated by said power spectrum calculator with each other for said plurality of input signals, and that selects a spectral component having a largest value for each frequency to form and generate a power spectrum as a synthesized power spectrum candidate, and said power spectrum synthesizer defines the power spectrum of one of said plurality of input signals as a representative power spectrum and carries out a synthesis from said representative power spectrum and the synthesized power spectrum candidate generated by said power spectrum selector according to the result of the analysis by said input signal analyzer to generate a synthesized power spectrum.

3. The noise suppression device according to claim 2, wherein said input signal analyzer calculates periodicity information and autocorrelation coefficients of said input signals on a basis of the power spectra calculated by said power spectrum calculator, and said power spectrum synthesizer carries out a synthesis from said representative power spectrum and the synthesized power spectrum candidate generated by said power spectrum selector according to the periodicity information and the autocorrelation coefficients of the input signals calculated by said input signal analyzer to generate a synthesized power spectrum.

4. The noise suppression device according to claim 2, wherein said power spectrum synthesizer carries out a synthesis from said representative power spectrum and the synthesized power spectrum candidate selected by said power spectrum selector on a basis of whether or not an average of subband SN ratios of said input signals is equal to or greater than a predetermined threshold to generate a synthesized power spectrum.

5. The noise suppression device according to claim 4, wherein said power spectrum synthesizer carries out a process of synthesizing a power spectrum having a continuous change by using either the average of the subband SN ratios of said input signals or a sound likeness index expressed by correlativity of the input signals.

6. The noise suppression device according to claim 5, wherein said power spectrum synthesizer carries out a weighted averaging process on said representative power spectrum and said synthesized power spectrum candidate to generate a synthesized power spectrum both for a section in which a sound section transitions to a noise section and for a section in which a noise section transitions to a sound section in each of said input signals.

* * * * *